(12) United States Patent
Behruzi et al.

(10) Patent No.: US 8,025,721 B2
(45) Date of Patent: Sep. 27, 2011

(54) TANK WITH A GAS SUPPLY AND EXTRACTION DEVICE FOR STORING CRYOGENIC LIQUID OR FUEL FOR SPACECRAFT

(75) Inventors: Kei Philipp Behruzi, Bremen (DE); Gaston Netter, Vollersode (DE)

(73) Assignee: Astrium GmbH, Ottobrunn (DE)

(*) Notice: Subject to any disclaimer, the term of this patent is extended or adjusted under 35 U.S.C. 154(b) by 358 days.

(21) Appl. No.: 12/455,160

(22) Filed: May 29, 2009

(65) Prior Publication Data

US 2009/0293729 A1 Dec. 3, 2009

(30) Foreign Application Priority Data

Jun. 3, 2008 (DE) .................. 10 2008 026 320

(51) Int. Cl.
*B01D 19/00* (2006.01)
(52) U.S. Cl. ............ 96/190; 55/444; 220/745; 220/747; 220/749
(58) Field of Classification Search .................... 96/188, 96/189, 190; 55/443, 444; 220/745, 746, 220/747, 749; 137/154, 590
See application file for complete search history.

(56) References Cited

U.S. PATENT DOCUMENTS

| | | |
|---|---|---|
| 2,107,390 A | 2/1938 | Rosmait |
| 2,163,988 A | 6/1939 | Stacey |
| 2,519,393 A | 8/1950 | Noyes |
| 2,711,756 A | 6/1955 | Peck et al. |
| 2,732,071 A | 1/1956 | Crow |
| 2,884,937 A | 5/1959 | Myers, Jr. |
| 2,943,815 A | 7/1960 | Besson |
| 3,020,950 A | 2/1962 | Schraivogel |
| 3,084,472 A | 4/1963 | Feik |
| 3,180,084 A | 4/1965 | Meeks |
| 3,202,160 A | 8/1965 | Barger |
| 3,232,560 A | 2/1966 | Moise et al. |
| 3,234,728 A | 2/1966 | Christian et al. |
| 3,234,853 A | 2/1966 | Aber |
| 3,315,845 A | 4/1967 | Vaiden |
| 3,457,864 A | 7/1969 | Price |
| 3,744,738 A | 7/1973 | Howard |
| 3,782,416 A | 1/1974 | Levin |
| 3,854,905 A | 12/1974 | Balzer et al. |
| 3,933,448 A | 1/1976 | Di Peri |
| 4,027,494 A | 6/1977 | Fletcher et al. |
| 4,168,718 A | 9/1979 | Hess et al. |

(Continued)

FOREIGN PATENT DOCUMENTS

CA 683 854 4/1964

(Continued)

*Primary Examiner* — Robert A Hopkins
(74) *Attorney, Agent, or Firm* — W. F. Fasse; W. G. Fasse

(57) ABSTRACT

A gas supply and extraction device is arranged preferably on a tank lid or a tank wall in a tank for storing a pressurized driving gas and a liquid such as fuel or oxidizer for operation of a spacecraft. A device housing defines an interior reservoir space. Upper trumpet-shaped passage bodies and a lower trumpet-shaped passage body communicate from the interior reservoir space into the interior space of the tank. By capillary effects, baffle plates, deflector plates, capillary plates, a separation chamber and other components separate liquid from gas entering the device, so that the gas can be extracted while the liquid is stored in the reservoir space of the device until it is drained back into the tank during an accelerated operation phase of the spacecraft.

23 Claims, 9 Drawing Sheets

U.S. PATENT DOCUMENTS

| | | | |
|---|---|---|---|
| 4,253,490 A | 3/1981 | Hansel | |
| 4,272,257 A | 6/1981 | Ellion et al. | |
| 4,394,966 A | 7/1983 | Snyder et al. | |
| 4,399,831 A | 8/1983 | Robert | |
| 4,435,196 A | 3/1984 | Pielkenrood | |
| 4,489,745 A | 12/1984 | Netter et al. | |
| 4,617,031 A | 10/1986 | Suh et al. | |
| 4,709,723 A | 12/1987 | Sidaway et al. | |
| 4,733,531 A | 3/1988 | Grove | |
| 4,743,278 A | 5/1988 | Yeh | |
| 4,768,541 A | 9/1988 | Uney et al. | |
| 4,790,350 A | 12/1988 | Arnold | |
| 4,844,276 A | 7/1989 | Kunze et al. | |
| 4,848,987 A | 7/1989 | Howard et al. | |
| 4,898,030 A | 2/1990 | Yeh | |
| 4,901,762 A | 2/1990 | Miller, Jr. et al. | |
| 4,976,398 A | 12/1990 | Bruhn | |
| 5,071,093 A | 12/1991 | Perdu | |
| 5,209,115 A | 5/1993 | Bond | |
| 5,240,038 A | 8/1993 | Canedi | |
| 5,263,329 A | 11/1993 | Grove et al. | |
| 5,279,323 A | 1/1994 | Grove et al. | |
| 5,293,895 A | 3/1994 | Grove et al. | |
| 5,441,219 A | 8/1995 | Rauscher, Jr. | |
| 5,449,029 A * | 9/1995 | Harris | 141/198 |
| 5,901,557 A | 5/1999 | Grayson | |
| 6,003,534 A | 12/1999 | Gould et al. | |
| 6,014,987 A | 1/2000 | List et al. | |
| 6,298,868 B1 | 10/2001 | Dean et al. | |
| 6,536,468 B1 | 3/2003 | Wilmer et al. | |
| 6,745,983 B2 | 6/2004 | Taylor | |
| 7,077,885 B2 | 7/2006 | Charlat | |
| 7,395,832 B2 | 7/2008 | Behruzi et al. | |
| 2007/0145194 A1 | 6/2007 | Behruzi et al. | |
| 2008/0237099 A1 | 10/2008 | Behruzi et al. | |
| 2009/0134170 A1 | 5/2009 | Behruzi et al. | |

FOREIGN PATENT DOCUMENTS

| | | |
|---|---|---|
| DE | 100 40 755 | 3/2002 |
| DE | 101 17 557 | 10/2002 |
| EP | 0 476 720 | 3/1992 |
| GB | 2 109 760 | 6/1983 |

* cited by examiner

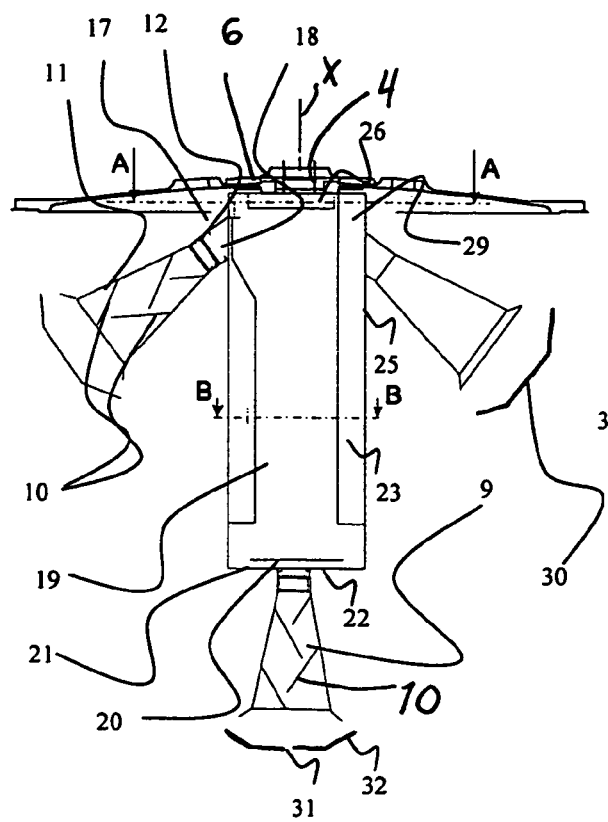
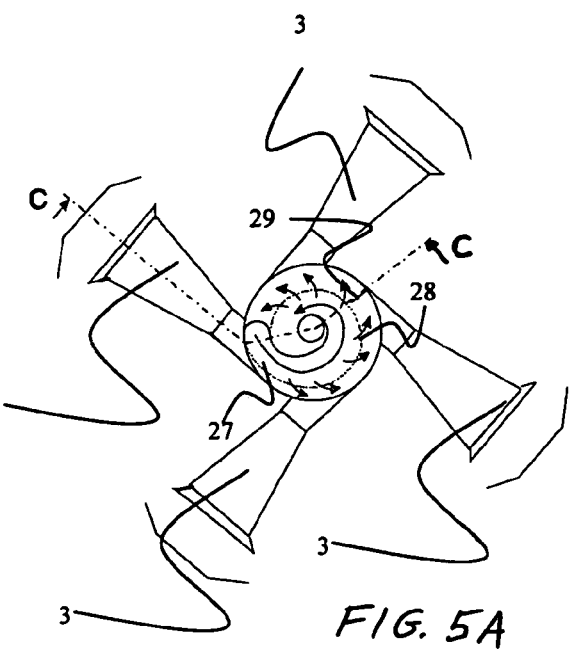
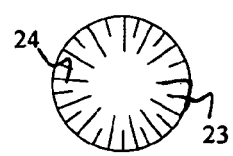
FIG. 5C
FIG. 5A
FIG. 5B

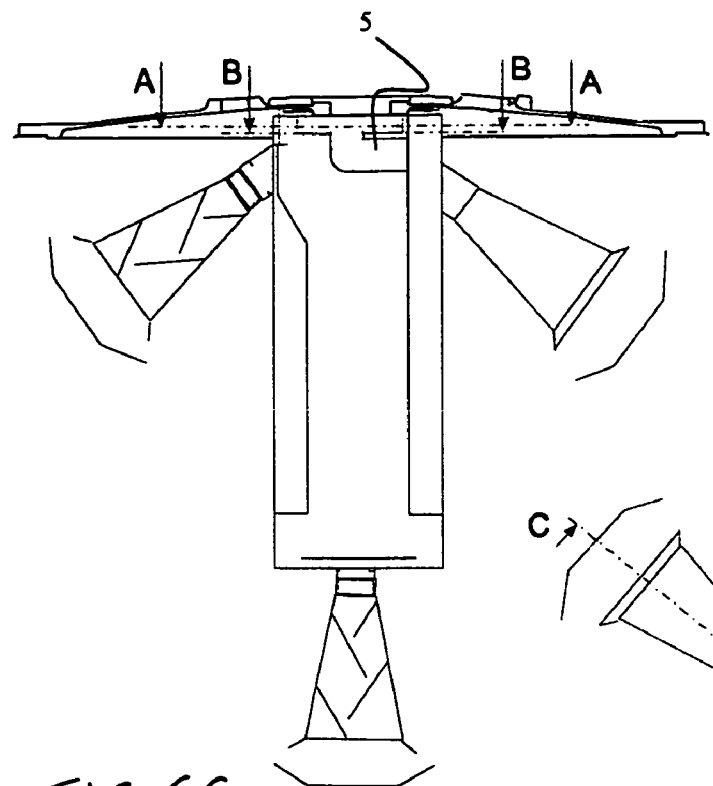
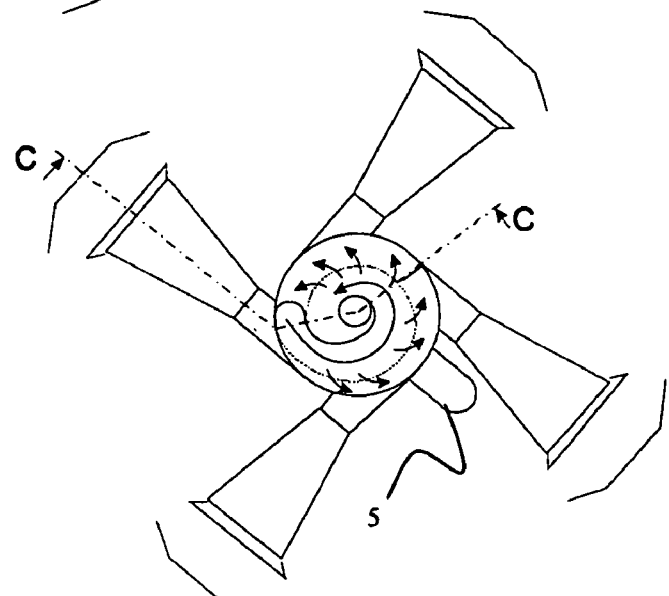
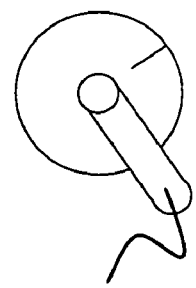
FIG. 6C
FIG. 6A
FIG. 6B

TANK WITH A GAS SUPPLY AND EXTRACTION DEVICE FOR STORING CRYOGENIC LIQUID OR FUEL FOR SPACECRAFT

CROSS REFERENCE TO RELATED APPLICATION

The present application is related to U.S. application Ser. No. 12/012,640 filed on Feb. 4, 2008 by the same inventors as the present application, and published as US 2008/0237099 on Oct. 2, 2008. The entire disclosure of the earlier related application is incorporated herein by reference.

PRIORITY CLAIM

This application is based on and claims the priority under 35 U.S.C. §119 of German Patent Application 10 2008 026 320.6, filed on Jun. 3, 2008, the entire disclosure of which is incorporated herein by reference.

FIELD OF THE INVENTION

The invention relates to a tank for storing a cryogenic liquid or a liquid fuel for the operation of a spacecraft, wherein a pressurized driving gas serves to drive the liquid or fuel out of the tank, and wherein the tank is fitted with a gas supply and extraction device that uses surface tension to separate the driving gas from the liquid.

BACKGROUND INFORMATION

Tanks of the above mentioned type are used for storing liquid components, for example a liquid fuel on the one hand and a liquid oxidizer on the other hand, for operating a spacecraft. A pressurized driving gas is introduced into the tanks to convey or drive the liquid components out of the tanks to the combustion chamber or reaction chamber of the spacecraft in which the fuel and oxidizer will be consumed. Inert gases such as helium (He) or nitrogen ($N_2$) are typically used as driving gases, for which purpose they are introduced under pressure into the fuel tank or the oxidizer tank and thereby press the fuel or the oxidizer into the pipeline system leading from the respective tank to the connected rocket engine. In that regard it is important to achieve a complete, reliable and sure separation between the driving gas used as a conveying medium and the liquid fuel or oxidizer being supplied into the engine, because the liquid fuel and oxidizer must absolutely surely be free of foreign gas inclusions when they are supplied to the engine in order to avoid combustion problems.

When a cryogenic liquid, especially liquid hydrogen, is stored in a tank, the warming of the liquid, e.g. the liquid fuel, over time generally leads to a pressure increase in the tank due to the boiling or vaporizing effect of the cryogenic liquid becoming a gas. The resulting over-pressure must be vented out of the tank upon reaching an upper pressure limit value in order to maintain the structural integrity of the tank. This problematic situation especially arises in cryogenic liquid storage systems for space travel vehicles that must operate over a long time span in orbit in a weightless condition. Over such long time spans, the cryogenic liquids, e.g. fuel and oxidizer, warm up and transition to a gaseous state as described above. In such orbital spacecraft, the excess gas in the tank is then often withdrawn or extracted from the tank and used for position or attitude regulation of the spacecraft. Namely, the cold gas is vented out of the fuel or oxidizer tank and is ejected in a purposefully directed manner through one or more thrust nozzles into the vacuum of space, so as to impart the appropriate positioning or orienting thrust to the spacecraft. Such a system saves costs, complexity, and weight in comparison to the provision of an additional propulsion system for the position and attitude adjustment, and represents a completely adequate variant for thrust generation.

During this process of controlled venting of the tank to generate thrust for position or attitude regulation, if a gas-liquid mixture is extracted from the tank and ejected into the vacuum of space, then the varying densities of the ejected stream of liquid and gas would lead to a varying non-constant thrust profile depending on the mixing ratio. Thus, the regulating algorithm of the thruster system of the spacecraft would then have to correct for these changes or variations of the thrust in view of the mission requirements. Moreover, the ejection of liquid out of the gas extraction arrangement is undesirable insofar as the liquid fuel is then no longer available for fueling the main rocket engine of the spacecraft.

For surely separating the gas and liquid phases in the above context, it has previously been known to carry out the following separation methods in the field of space travel. According to one known method, the mixture of gas and liquid fuel extracted from the tank is heated sufficiently to ensure that any liquid emitted from the fuel tank is vaporized into the gaseous state. Thereby, it is ensured that only gas is supplied to the thruster nozzles. However, this method requires a high amount of energy for vaporizing the liquid fuel. According to a second known method, an additional acceleration is imparted to the spacecraft and thus the fuel tank, so that at the time point of the pressure venting of the tank, the liquid fuel is not located at the gas venting outlet. This method, however, requires an active directed acceleration of the spacecraft by means of an additional propulsion system, which is generally relatively costly and complicates the operation of the spacecraft. Additionally, it is then necessary to adapt the mission profile before carrying out a pressure venting of the tank.

Furthermore it has become known from U.S. Pat. No. 4,027,494 to use phase separators for separating the liquid from the gaseous phase. In this known apparatus a phase separator is used during flight conditions of the spacecraft with only small or minimal acceleration, whereby the separation is carried out by using superconducting magnets. U.S. Pat. No. 4,848,987 further discloses a phase separator that uses pumps and a series of active valves for achieving the phase separation. Still further, U.S. Pat. No. 7,077,885 discloses a phase separator that uses a propeller to set a liquid-gas mixture into rotation, and that comprises a membrane of polyethylene or nylon to separate out the liquid, in this case water. This latter known system is provided for use in connection with fuel cells and is not suitable for separation of cryogenic liquids from gases. Further apparatuses known from U.S. Pat. Nos. 4,435,196 and 4,617,031 are limited to use in the gravitational field of earth, and are thus not suitable for separating cryogenic liquids from gases in tanks in spacecraft.

SUMMARY OF THE INVENTION

In view of the above it is an object of the invention to provide a tank arrangement of the above discussed general type that achieves a sure and reliable phase separation of gases from cryogenic as well as non-cryogenic fuels and other liquids at various different acceleration conditions ranging from weightless conditions and low acceleration conditions during ballistic flight phases of a spacecraft up to high acceleration conditions during the main thrust phases, as they arise in a space flight system. The invention further aims to provide a simpler, more robust and more economical gas extraction device for such a tank arrangement than the prior art. The invention still further aims to avoid or overcome the disadvantages of the prior art and to achieve additional advantages, as apparent from the present specification. The attainment of these objects is, however, not a required limitation of the claimed invention.

The above objects have been achieved according to the invention in a tank arrangement for storing cryogenic or non-cryogenic liquids such as storable fuels for the operation of spacecraft, and a pressurized driving gas serving as a conveying medium for driving the liquid out of the tank. The tank comprises a tank shell that bounds a tank interior space therein, and that comprises a tank wall with a tank opening as well as a tank lid that closes or covers the tank opening. The arrangement further includes at least one gas supply and extraction device comprising a refillable reservoir that is arranged in the tank and that uses baffles or capillary plates and screens or sieves under the effect of surface tension to separate the gas from the liquid. Particularly according to the invention in such a tank arrangement, the gas supply and extraction device is preferably arranged in the upper portion of the tank, for example in the upper half of the tank, and includes a device housing that is preferably essentially cylindrical. The device and especially the device housing is arranged directly on and connected directly to the tank shell, e.g. preferably the tank lid, at the upper portion of the tank. The gas extraction device further includes a plurality of passage bodies that are arranged on the perimeter of the device housing near a first end (e.g. the upper end) thereof, and at least one additional passage body that is arranged at the opposite second end of the device housing. The passage bodies provide respective passage openings which flare so that the openings enlarge outwardly away from the device toward the interior of the tank. The passage bodies are thus preferably trumpet shaped. The device further includes a gas conduit that leads from the inside of the device housing out from the tank to an outlet, and preferably to at least one gas consumer, e.g. a thruster nozzle, of the spacecraft. The passage bodies providing the expanding openings are each respectively equipped with plates, preferably metal plates, that protrude into the opening from the inner wall of the passage body successively on opposite alternating sides of the passage body. The opening of each passage body preferably communicates through a double screen or sieve sleeve with the interior of the device housing. Furthermore, capillary plates extending parallel to the longitudinal axis of the housing are arranged on the inner wall of the device housing. The device housing, the passage bodies and the various different plates, as well as the tank shell, are preferably made of metal, but other materials such as fiber reinforced composites or plastics are also suitable depending on the particular application. A respective baffle plate is preferably arranged in the tank interior space in front of the outer flared opening of each respective passage body, and the baffle plate of the passage body at the second end of the device housing has at least one hole passing therethrough.

The penetration of liquids into the opening of the trumpet-shaped passage body is substantially prevented by the arrangement of successive capillary plates protruding alternately from opposite sides of the passage body inner wall into the opening of the passage body. The double screen sleeve and a further wetting barrier leading from the passage body into the interior of the device housing further serve to block the passage of liquid in a preferred embodiment as will be discussed below. Nonetheless, if liquid does penetrate into the interior of the gas supply and extraction device housing, for example due to larger liquid movements, then the penetrating liquid will be captured and guided away by the capillary plates in the interior of the reservoir and will thereby be separated from the gas.

Thus, the gas supply and extraction device provided in the tank arrangement according to the invention has the advantage, with the installed fixed mechanical capillary plates and screens, that it consists of only passive components, i.e. does not require or use any active components, for example does not comprise any active valves, to carry out the separation of gas from liquid. Therefore, the entire system does not require any additional or separate controller for controlling the gas extraction device, but rather the separation of the gas from the liquid occurs passively by the fixed mechanical components. This is a significant advantage over gas separation systems that use active components and require a specialized control, for example systems that require a pre-acceleration for separating the liquid from the gas, or that achieve a phase separation using active control of valves or using an additional heating and vaporization of the fuel. Therefore, the tank arrangement according to the invention is characterized by a considerably simplified construction, an increased reliability and robustness, and reduced costs, in comparison to active systems, and further ensures the liquid-free extraction of gas out of the tank arrangement during phases of reduced acceleration, such as weightless phases or ballistic flight phases, as well as during accelerated flight phases as they arise in connection with the upper stages of rockets and transfer vehicles in space flight.

It is a special feature of the tank according to the present invention, that it is equipped with a gas supply and extraction device in which the bottom area of the device housing has only one trumpet-shaped or flaring passage body that forms a corresponding flaring opening. More particularly, a single trumpet-shaped passage body that defines a flaring opening is provided centered axially on the lengthwise axis of the housing, on the bottom wall or floor of the housing, of the gas supply and extraction device. Additional trumpet-shaped passage bodies are provided in the upper area of the device housing. This provides an especially simple construction of the gas supply and extraction device, and also achieves an optimum ease and adaptability of the installation thereof, and also optimizes the weight, and the later inspection and maintenance or replacement thereof. The latter is especially an important aspect of the inventive apparatus for application in reusable spacecraft or spaceflight systems, to which the tank according to the invention is especially well suited.

A further advantage of the inventive tank arrangement is that it achieves a very good thermal connection and heat transfer junction between the gas supply and extraction device and the tank shell or wall structure of the tank. To achieve this, preferably the gas supply and extraction device is directly mounted on or directly connected to the tank lid that covers a tank opening in the area of the upper tank dome where the driving gas predominantly accumulates. In this area of the upper tank dome, the temperature is especially high relative to the temperature of the cryogenic liquid fuel stored in the tank, and the tank shell becomes heated (relative to the cryogenic liquid fuel) especially well by heat introduction (e.g. thermal conduction) into the tank. Because the gas supply and extraction device, according to the invention, is directly structurally and thermally connected with the tank lid, this arrangement of the gas supply and extraction device additionally performs as a heat exchanger in the gas outlet area of the tank shell. Thus, the inventive gas supply and extraction device additionally serves to ensure more-constant temperature conditions, especially when the pressurized driving gas (and/or fuel vapor) in the tank quickly cools-off during a pressure release from the tank through the gas supply and extraction device. Among other things, this especially has a positive influence on position regulating systems, e.g. thrusters that are operated or driven with the pressurized gas. This effect is especially strong in applications with cryogenic fuels, of which the gas temperature generally increases considerably along with the separation of the gas from the liquid phase.

Still further, the inventive direct mounting or connection of the gas supply and extraction device on the tank lid of the tank also provides the advantages of easier installation, maintenance, repair, or replacement of the gas supply and extraction device, and also the advantage that in this manner the gas supply and extraction device can be installed in the tank at a later point in time. This allows the gas supply and extraction device to be later retrofitted onto existing tanks without significant modifications, and also simplifies the tank verification and approval process. Namely, the necessary verification tests, for example such as vibration tests to prove the structural strength, integrity and reliability of the arrangement, can thus be carried out on a sub-component comprising the gas supply and extraction device together with the tank lid on which it is mounted, in that merely the tank lid with the gas supply and extraction device mounted thereon simply needs to be clamped into the testing system and vibrated to carry out the vibration test. These tests conducted at the component level are much simpler and therefore achieve a considerable cost savings in comparison to systems in which the structural integrity of the entire complete tank arrangement including any gas supply and extraction system arranged in the tank must be tested and verified as a whole, i.e. as a complete tank system rather than on a sub-component basis.

BRIEF DESCRIPTION OF THE DRAWINGS

In order that the invention may be clearly understood, example embodiments thereof will now be described in further detail with reference to the accompanying drawings, wherein:

FIG. 5A is a cross-sectional view through the gas supply and extraction device of the arrangement according to FIG. 1, along the section line A-A in FIG. 5C;

FIG. 5B is a cross-sectional view through the gas supply and extraction device of the arrangement according to FIG. 1 along the section line B-B shown in FIG. 5C;

FIG. 5C is a longitudinal sectional view through the gas supply and extraction device of the arrangement according to FIG. 1, along the section line C-C shown in FIG. 5A; FIG. 6A is a cross-sectional view through a gas supply and extraction device according to an alternative embodiment compared to FIG. 5A, especially involving a different location and arrangement of the gas conduit system, along the section line A-A shown in FIG. 6C;

FIG. 6B is a cross-sectional partial view through a portion of the alternative embodiment of the gas supply and extraction device according to FIG. 6A, along the section line B-B shown in FIG. 6C;

FIG. 6C is a longitudinal sectional view through the alternative embodiment of the gas supply and extraction device according to FIG. 6A, along the section line C-C shown in FIG. 6A;

DETAILED DESCRIPTION OF PREFERRED EXAMPLE EMBODIMENTS AND OF THE BEST MODE OF THE INVENTION

Figure 1:
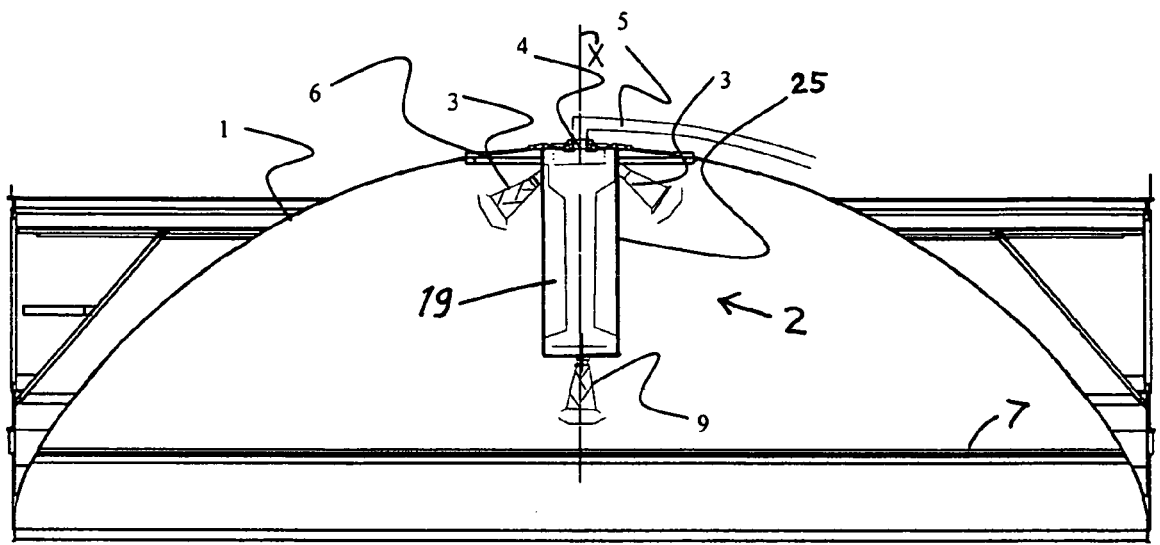
FIG. 1 is a partial sectional view of the upper portion of an upper stage tank arrangement of a space craft, with a gas supply and extraction device according to the present invention installed therein.

FIG. 1 schematically shows an upper portion of an upper stage fuel tank with a curved shape, as typically used in an upper stage of a spacecraft. The fuel tank arrangement includes a tank shell 1 enclosing the interior tank space of the tank, as well as a gas supply and extraction device 2 arranged in the upper portion of the tank shell 1. The tank shell 1 includes a tank wall and a tank lid 6 that covers or closes an opening in the tank wall. The tank wall and the tank lid 6 may be made of metal, plastic, composite material, or other known suitable material.

Throughout this application, the "upper" portion of the tank or of the gas supply and extraction device 2, for example, refers to the portion oriented away from the thrust outlet of the main rocket engine or a thruster of the spacecraft (which is not shown), i.e. in the direction of the thrust produced by a main rocket engine or a thruster of the spacecraft. References to directions such as "up" and "down", or "upper portion" and "lower portion", or "top" and "bottom", can also refer to the ordinarily understood directions with reference to a gravitational field such as the earth's gravitational field, when the spacecraft is positioned within such a gravitational field, as well as the designed directions of the components with respect to a gravitational field or the thrust acceleration direction of the main rocket engine or a thruster of the spacecraft.

The tank arrangement, and particularly the tank interior space bounded by the tank shell 1, is for storing a liquid fuel such as monomethylhydrazine (MMH) and/or hydrazine ($N_2H_4$), or for storing an oxidizer such as dinitrogentetroxide ($N_2I_4$). Alternatively, the tank is for storing a cryogenic liquid such as liquid hydrogen or liquid oxygen. In this application, a liquid for operation of a spacecraft is understood generally to include any and all fuels, any and all oxidizers, and any and all other substances that can be stored in a liquid phase and that can be used for any aspect of the operation of a spacecraft. The gas supply and extraction device 2 serves to allow an additional gas and/or a gas arising from the vaporized liquid to be supplied into or extracted from the interior tank storage space enclosed by the tank shell 1. For example, a pressurized driving gas is to be supplied into the tank in order to pressurize the tank, drive the liquid fuel out of the tank to a main rocket engine or the like, and/or replace the volume of the liquid fuel that is removed from the tank for powering the main rocket engine. Also, as evaporation of the liquid fuel increases the pressure in the tank, a gas phase, e.g. including the pressurized driving gas and/or evaporated fuel, must be extracted from the tank to avoid an excessive pressure therein. This cold gas is also used for propulsion by being ejected through positioning thrusters or the like. The gas supply and extraction device 2 ensures that the gas and liquid phases can be surely separated from one another, so that gas can be extracted from the tank without any liquid included in the extracted gas.

Particularly, the gas supply and extraction device 2 (also called a "gas extraction device" herein for simplicity) is preferably mounted directly on a tank lid 6 that covers and closes the tank opening at the top of the tank shell 1. The gas supply and extraction device 2 basically comprises a device housing 25 as well as trumpet-shaped passage bodies 3 and 9 that form trumpet-shaped or conically flaring openings that provide communication passages between the interior space of the fuel tank and the interior reservoir space 19 in the gas supply and extraction device 2. Particularly, preferably plural upper trumpet-shaped passage bodies 3 are connected to and extend from the perimeter of the device housing 25 at the upper portion thereof near the tank lid 6 of the tank shell 1, all the way at the top inside the fuel tank, and preferably a single lower trumpet-shaped passage body 9 is arranged on and extends from the bottom area of the device housing 25 of the gas supply and extraction device 2. The lower trumpet-shaped passage body 9 is preferably arranged all the way at the very bottom of the gas supply and extraction device 2, axially aligned on a central longitudinal axis X of the gas supply and extraction device 2. More particularly, for example, the upper trumpet-shaped passage bodies 3 are located within the upper 25% or more preferably the upper 10% of the height or longitudinal length of the tank, and no other openings other than the lower passage body 9 communicate out of the device housing 25 in the lower 75% or the lower 90% of the longitudinal length thereof.

A gas outlet and inlet passage 4 communicates the gas supply and extraction device 2 with a gas conduit system 5 that is only shown partially and schematically outside of the tank. In the example embodiment illustrated in FIG. 1, the gas passage or port 4 is located in the tank lid 6, so that the gas passes through the tank lid 6 to or from the gas conduit 5. However, this gas outlet and inlet passage 4 can be located at other suitable and desired locations, for example through the tank wall itself through the use of an additional connector conduit. Thereby there is a gas communication established from the interior storage space of the fuel tank, through the trumpet-shaped passage bodies 3 and 9, to the cylindrical interior reservoir space 19 of the gas supply and extraction device 2, and from there through the gas passage 4 to the gas conduit system 5, in both directions.

Depending on the particular requirements for the tank, the number of the trumpet-shaped passage bodies 3 in the upper portion of the gas supply and extraction device 2 can range or vary from only a single passage body 3, to a plurality of such passage bodies, for example four of such passage bodies in the case of the example embodiment illustrated and described here. The particular position and orientation of the passage bodies 3 and 9 is selected so that at least one of the conical flaring openings of the trumpet-shaped passage bodies 3 or 9 is not completely covered or surrounded with liquid 7 in the tank during the majority and preferably the substantial majority (e.g. at least 75% or preferably at least 90%) of the various operating or mission phases of the operation of the spacecraft. As long as at least one of the trumpet-shaped passage bodies is not completely covered by liquid 7, then a gas through-flow communication will be ensured. In this regard, the position of the trumpet-shaped passage bodies 3 in the tank enclosed by the tank shell 1 can be optimized depending on the requirements, whereby short temporary covering of even all of the passage bodies 3 and 9 by liquid can arise and can be tolerated. During such operational phases, the interior of the gas supply and extraction device 2 fills with liquid 7 while the displaced quantity of gas is driven out or extracted through the gas passage 4 to the conduit 5.

The various locations or distributions of the liquid 7 in the tank during various different mission phases of the spacecraft are schematically illustrated as examples in FIGS. 2A, 2B, 3A and 3B, for example.

Figure 2A:
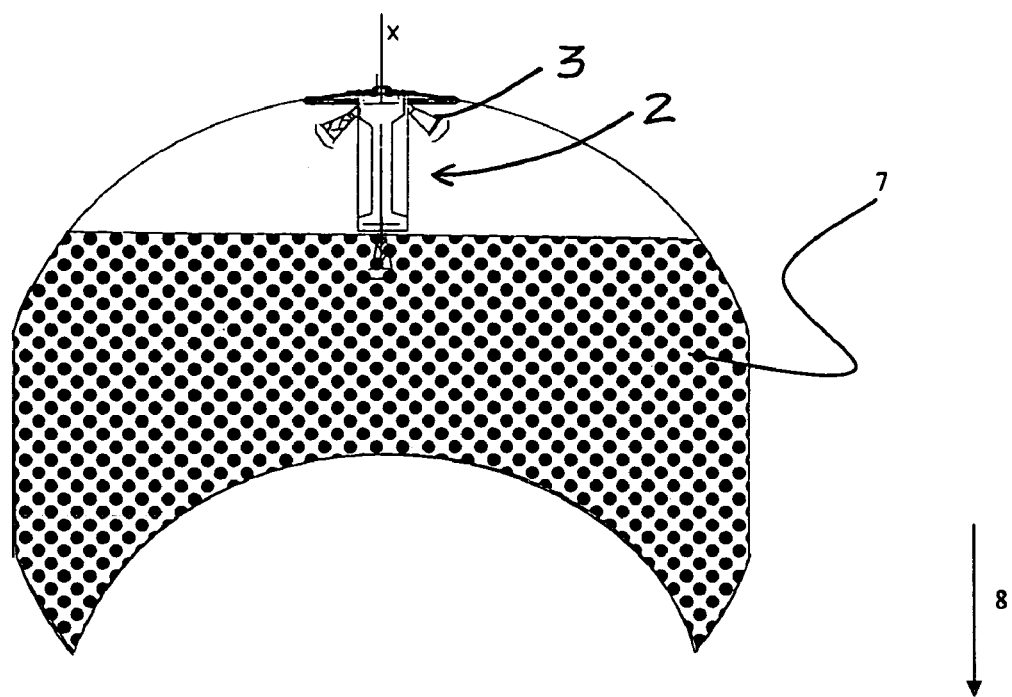
FIGS. 2A and 2B are two schematic sectional illustrations showing the distribution of liquid in the tank arrangement of FIG. 1 during spacecraft operation phases with high acceleration (linear acceleration in FIG. 2A, and rotational acceleration in FIG. 2B)
Figure 2B:
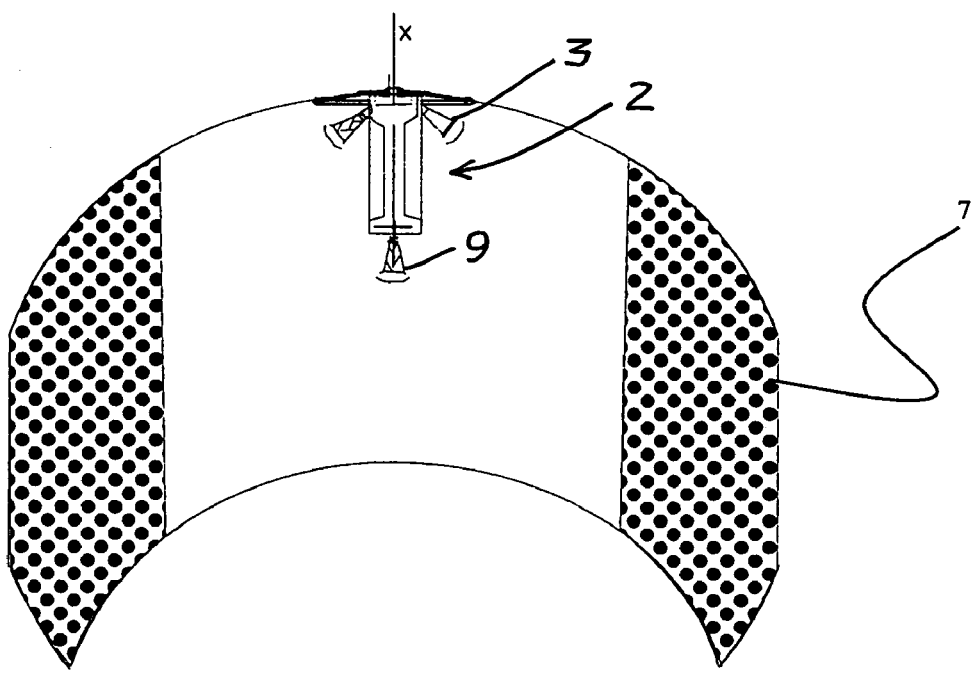

Phases with high acceleration are represented in FIGS. 2A and 2B. FIG. 2A represents the mission phase in which the main rocket engine of the spacecraft has ignited and is generating thrust that produces a substantial acceleration in the direction of the arrow 8 on the liquid 7 in the tank. The main rocket engine is not shown in the drawings, but can have any conventionally known rocket engine construction, configuration, arrangement and installation. Due to this substantial acceleration 8, the liquid 7 in the tank is driven downward to collect uniformly in the bottom of the tank, while leaving a top portion of the tank free of the liquid 7, i.e. containing only a gas phase. Thus, the gas supply and extraction device 2 located near the top of the tank has at least the upper trumpet-shaped passage bodies 3 free of the liquid 7.

FIG. 2B schematically represents a mission phase of the spacecraft in which the spacecraft and thus the tank is rotating about the axis X. Due to the rotation, the centrifugal force causes the liquid 7 to collect uniformly against the radially outer wall of the tank shell 1, such that the entire gas supply and extraction device 2 including all of the trumpet-shaped passage bodies 3 and 9 is free of the liquid 7.

Another mission phase of interest is the starting or launch condition in which the rocket or other spacecraft is located on the ground on earth. In this condition, at the start of a mission with the spacecraft on the ground, the tank is predominantly filled with liquid 7 so that the gas supply and extraction device 2 is also substantially submerged in and filled with liquid. At this time, it is generally not necessary to extract gas out of the tanks. However, preferably at least the upper trumpet-shaped passage bodies 3 are not completely submerged in the liquid, even with a "full" tank while the spacecraft is on the ground and before engine ignition, so that the tank can be pressurized or vented through the gas conduit 5 and the gas supply and extraction device 2 at any time. Such a condition or mission phase can also be understood in connection with the illustration of FIG. 2A in which earth's gravity applies the gravitational acceleration in the direction 8.

During the first main ignition of the main engine, the liquid 7 such as the liquid fuel and/or oxidizer is extracted from the tank storage space bounded within the tank shell 1, and correspondingly any liquid present in the interior reservoir space 19 of the gas supply and extraction device 2 is also drained out of the device 2 into the tank. During this phase of the extraction of the liquid out of the tank, a pressurized driving gas is introduced through the gas supply and extraction device 2 into the tank so as to replace the withdrawn liquid. The reservoir space is appropriately dimensioned so that as soon as the first burn of the main engine is ended, the opening of the lower passage body 9 of the gas extraction device 2 is clear of, i.e. no longer in contact with, the liquid still remaining in the tank. Thus, once the first burn of the rocket engine has finished, the gas extraction system according to the invention is substantially free of liquid.

Figure 3A:
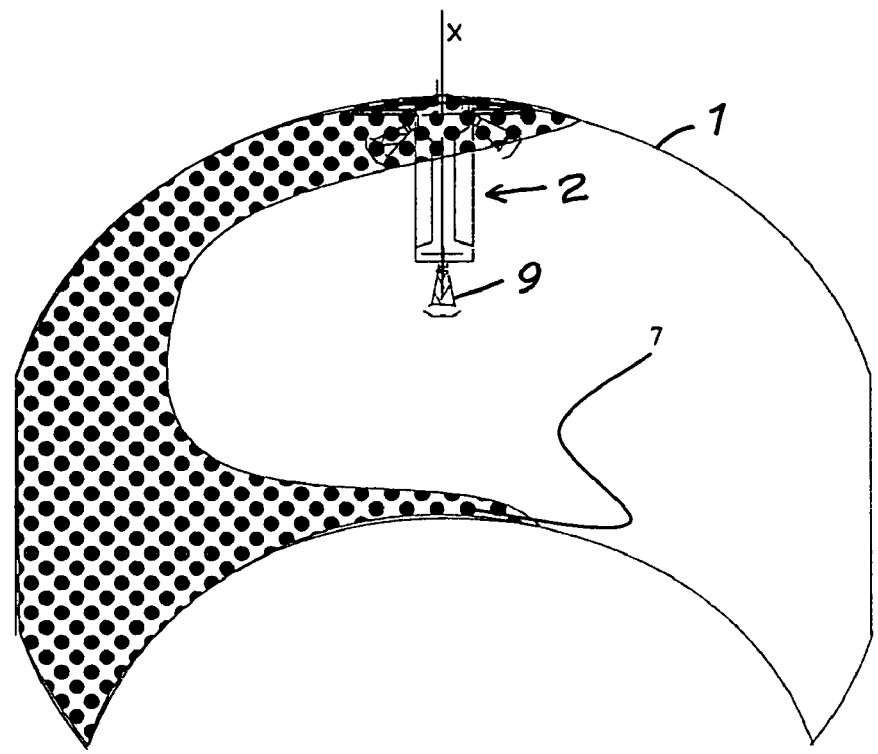
FIGS. 3A and 3B are two schematic sectional illustrations showing the distribution of liquid in the tank arrangement of FIG. 1 during spacecraft operation phases with low acceleration.
Figure 3B:
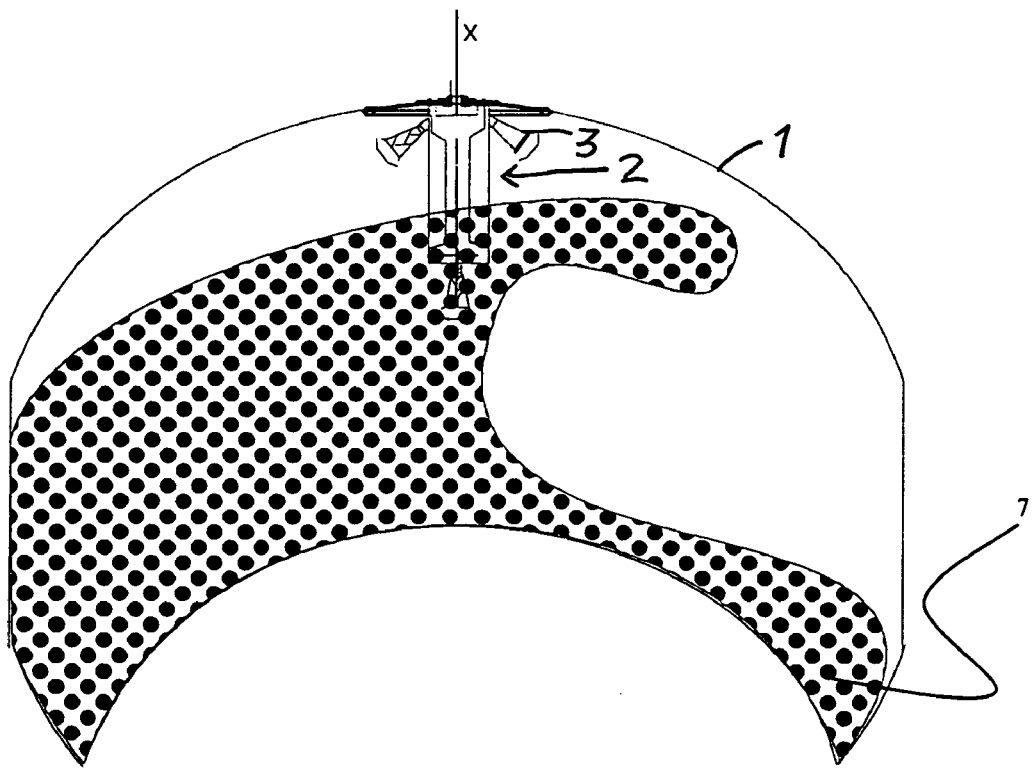

A further operation or mission phase of the spacecraft relates to ballistic flight phases with relatively low acceleration, for example during the deployment of a satellite, for example as represented in FIGS. 3A and 3B. In such operating phases, the liquid 7 is distributed variably and randomly in the tank and undergoes a chaotic motion, whereby the liquid may sporadically wet or cover the openings of the upper passage bodies 3 while uncovering the lower passage body 9 as shown in FIG. 3A, or sporadically wet or cover the opening of the lower passage body 9 while uncovering the upper passage bodies 3 as shown in FIG. 3B.

Figure 4A:
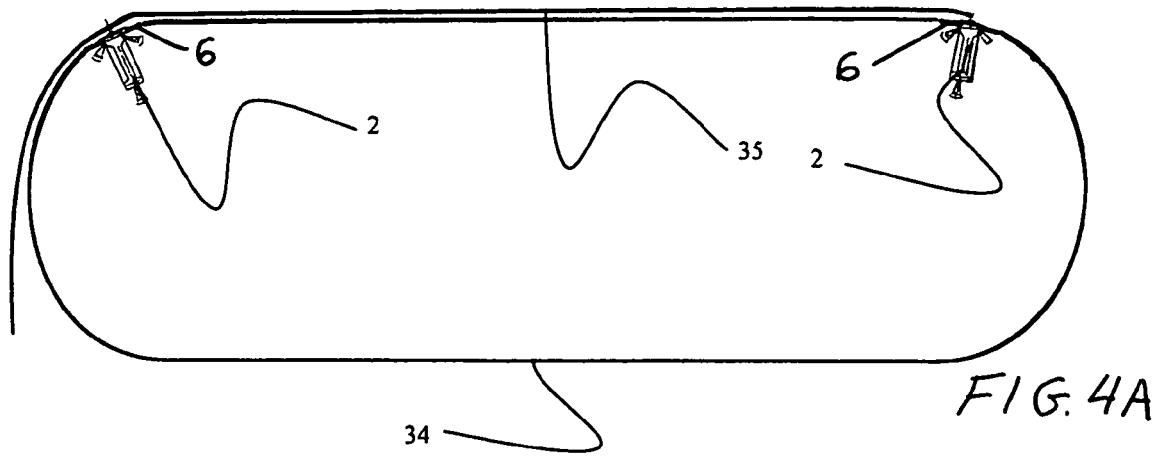
FIGS. 4A, 4B and 4C are three schematic sectional illustrations through a different tank embodiment in a spacecraft adapted to launch and land in a horizontal attitude, with three different distributions of the liquid in this tank.
Figure 4B:
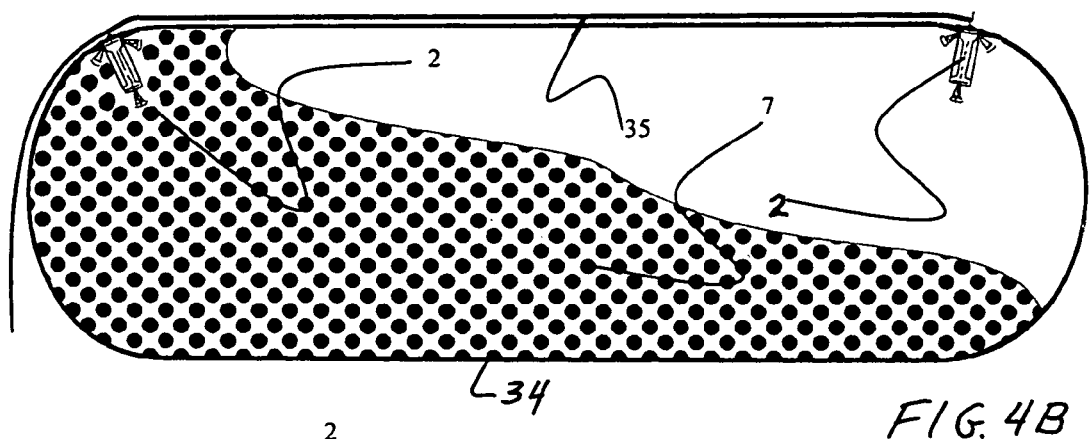
Figure 4C:
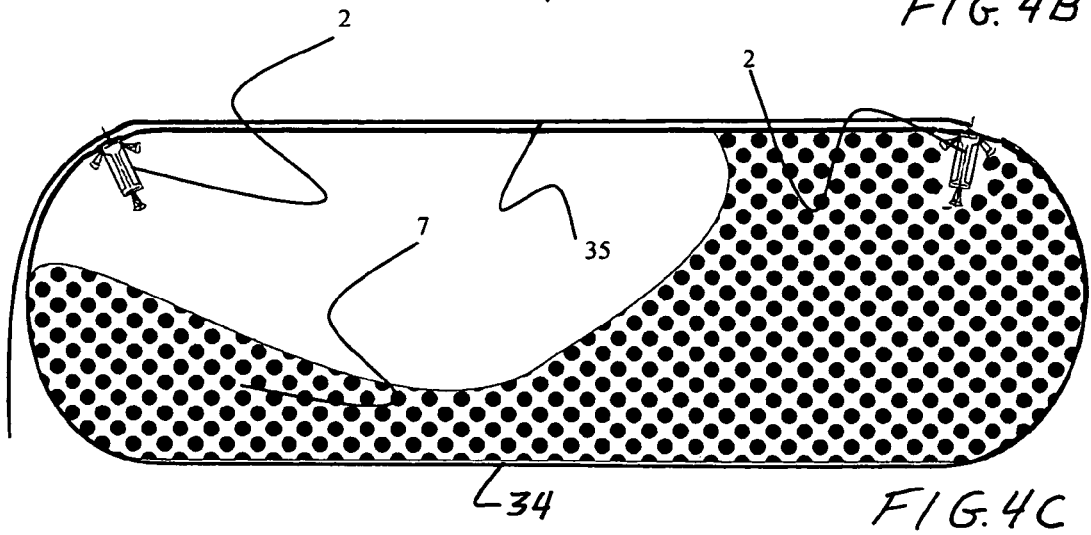

Depending on the configuration and construction of the tank, and depending on the planned spacecraft mission, several of the inventive gas supply and extraction devices 2 may be installed and integrated in the respective tank. For example, FIG. 4A schematically illustrates a tank 34 that has a generally oblong horizontal configuration, whereby this tank 34 is especially suitable for a spacecraft that launches and lands in a horizontal attitude. In this alternative embodiment, the same reference numbers are used for the same components as in the other embodiments as described with reference to the previous figures. In the present embodiment of the tank 34, as can be seen in FIG. 4A, two of the inventive gas supply and extraction devices 2 are arranged near upper ends or corners of the tank 34. For example, the gas supply and extraction devices 2 can each respectively be arranged on two tank lids 6 of the tank 34. Similar to the above discussed embodiment, in the present embodiment of a tank 34, the liquid 7 will be located in various different portions or areas of the tank during different mission phases on the ground and during flight of the spacecraft. For example, FIGS. 4B and 4C show two different variable or random distributions of the liquid 7 with a chaotic motion in the tank. In FIG. 4B, there is an acceleration that causes the liquid 7 to accumulate generally toward the left and bottom sides of the tank, while in FIG. 4C there is an acceleration that causes the liquid 7 to accumulate generally in the lower right portion of the tank. The accelerations may be due to a combination of a gravitational field and an accelerating motion of the spacecraft e.g. due to flight maneuvers or positioning maneuvers with positioning thrusters. As can be seen in FIGS. 4B and 4C, at least one of the gas supply and extraction devices 2 remains clear and free of liquid 7. The particular locations of the devices 2 are selected, i.e. the devices 2 are correspondingly distributed to suitable locations in the tank 34, depending on the planned mission profile of the spacecraft. The plural gas supply and extraction devices 2 are preferably connected with one another and to the gas conduit system by a connector conduit 35 in such a manner so that gas can be extracted and withdrawn from at least one unsubmerged gas extraction device 2 at all times and delivered to a gas consumer (not shown) such as a thruster for example. The number of the gas supply and extraction devices 2 to be provided is thereby also essentially unlimited and can be selected as desired or required for the particular situation.

The inventive gas supply and extraction device 2 of the previous drawing figures preferably has the multi-stage liquid separating construction as shown in FIGS. 5A, 5B and 5C. As mentioned above, the gas extraction device 2 comprises a shell forming a device housing 25 (e.g. of metal or composite), which is preferably cylindrical in the present embodiment, and which encloses an interior reservoir space 19. The device 2 further comprises a plurality, in the present embodiment five, trumpet-shaped passage bodies 3 and 9 forming openings that communicate from the interior storage space enclosed by the tank shell 1 into the interior reservoir space 19 of the device 2. These openings of the passage bodies 3 and 9 expand or flare outwardly in a conical shape in the manner of a trumpet. A series of plates 10 are arranged on the inner surface of each passage body 3 and 9 so as to protrude inwardly into the open passage. The plates 10 are preferably solid metal plates, but can alternatively be made of a different solid material or may be sieve or screen plates or perforated plates. The plates 10 are arranged alternately in succession one after another on opposite sides of the inner surface of the respective passage body 3 or 9. Also, the plates 10 are arranged so that they each form a respective acute angle with the respective inner wall of the passage opening of the passage body 3 or 9, with the vertex of each acute angle pointing inwardly toward the interior reservoir space 19 and forming a corner or corner pocket 11 between the plate 10 and the wall of the passage body 3 or 9.

Furthermore, a respective plate-shaped cover or baffle plate 30 or 32 is arranged in front of the outer mouth or opening of each respective passage body 3 and 9. Each passage body preferably further includes a conically expanding or flared rim facing the baffle plate 30 or 32, and the baffle plate preferably similarly has a conically flared rim facing and overlapping the conically flared rim of the passage body. Also, the plate-shaped cover or baffle plate 32 of the lower passage body 9 is preferably provided with at least one hole or perforation 31, through which liquid can drain, to prevent liquid from collecting in the plate-shaped baffle plate 32 during a liquid-draining phase, as will be discussed below.

The liquid 7 is predominantly deflected away from the opening of the passage bodies 3 or 9 by the baffle plates 30 or 32. Any liquid that does penetrate past the baffle plates into the respective passage body 3 or 9 will then be predominantly collected, due to capillary effects, in the acute angled corner pockets 11 formed between the plates 10 and the walls of the passage body 3 or 9.

Furthermore, the throat or neck of each trumpet-shaped passage body 3 or 9 is connected to the device housing 25 by a respective double screen or double sieve sleeve 12 and a pipe wall 18. Generally, the double screen sleeve 12 further serves to block the passage of any liquid through the throat of the opening of the respective passage body 3 or 9 into the interior reservoir space 19 of the device 2. The construction thereof is shown and will be described in further detail in connection with FIG. 7.

Figure 7:
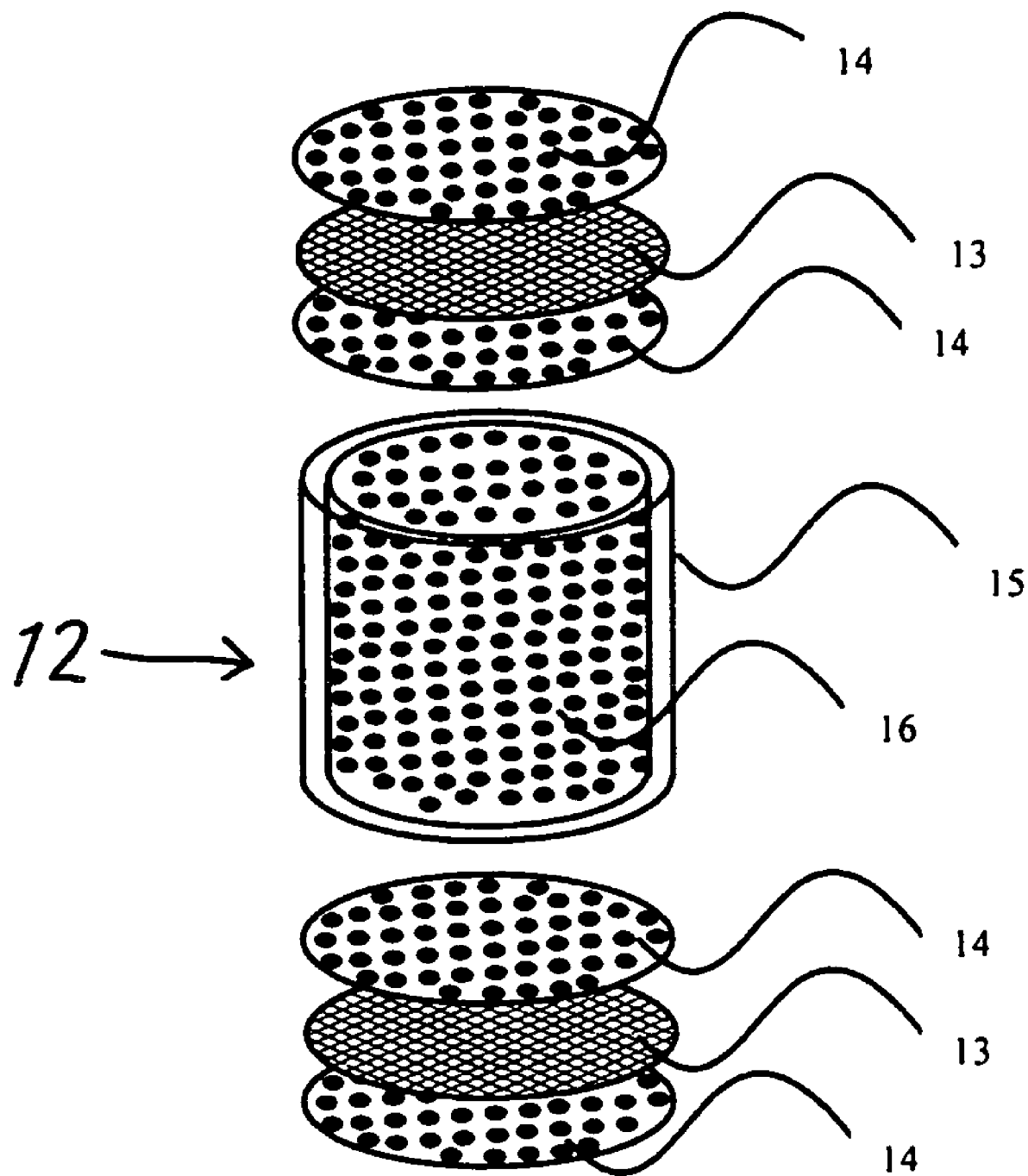
FIG. 7 is a perspective exploded view showing a portion of the device according to FIGS. 5A, 5B and 5C in detail.

The exploded view shown in FIG. 7 depicts several components making up the double screen sleeve 12. Two screens or sieves 13 are respectively bounded and sandwiched between perforated plates 14, and furthermore two cylindrical sleeves 15 and 16 are arranged concentrically within one another between the two combinations or sandwiches of the screen disks 13 and the perforated plates 14. Particularly, the outer cylindrical sleeve 15 is preferably a solid cylindrical sleeve, while the inner sleeve 16 is preferably a perforated cylindrical sleeve provided with holes.

If liquid penetrates into the throat area of the trumpet-shaped passage body 3 or 9, the wetting effect of the liquid in the areas between the screens 13 and the perforated plates 14, and between the perforated sleeve 16 and the solid sleeve 15, leads to a complete wetting of the solid body structures of these components and the formation and inclusion or enclosure of a gas bubble in the interior space of the double screen sleeve 12. As a result, the penetration of liquid through or past the double screen sleeve 12 is reduced by the so-called bubble point pressure of the two screens 13. This bubble point pressure is the pressure that the flow must apply in order to break the wetting films and push or remove the gas bubble out of the interior region of the double screen sleeve 12. Thereby, the penetration of larger quantities of liquid is effectively minimized. In that regard, the necessary bubble point pressure for blocking or preventing the penetration of liquid depends on the flow velocity of the liquid-gas mixture.

Still further, after the double screen sleeve 12, the gas supply and extraction device 2 includes a wetting barrier 17 formed in the pipe wall 18 connecting to the device housing 25. This wetting barrier 17 may simply be formed by a weld edge, weld bead or weld seam, or alternatively by an annular disk arranged perpendicularly on the inner surface of the pipe wall 18. This wetting barrier 17 further serves to block the penetration of any liquid wetting the inner surface of the passage body.

The trumpet-shaped passage bodies 3 and 9 are connected to and communicate into the interior reservoir space 19 of the device housing 25, which is a cylindrical reservoir space in a cylindrical housing 25 in the present example embodiment. Any remaining liquid that has penetrated past the other barriers as described above is to be separated and accumulated inside the reservoir space 19 of the housing 25. Alternatively to a cylindrical shape, in order to enlarge or increase the volume of the interior reservoir space 19, the interior reservoir space in the housing may have a different geometric shape or a variable diameter, for example a substantially spherical interior space or a quadratic round shape of the interior space instead of a cylindrical shape.

Furthermore, the interior reservoir space 19 of the device 2 is preferably provided with an interior baffle plate 20 arranged near and parallel to the bottom wall or floor 22 of the device housing 25, so as to form a narrow gap 21 between the plate 20 and the bottom wall or floor 22, over the throat of the lower trumpet-shaped passage body 9. Thereby, this plate 20 further serves to block the flow of liquid through the lower passage body 9 into the interior reservoir space 19, whereby especially the narrow gap 21 preferably blocks the flow of liquid by capillary effects as well as physical baffling.

A plurality of capillary plates 23 and 24 are arranged extending longitudinally along the inner wall of the device housing 25 and protruding radially inwardly into the interior reservoir space 19. These capillary plates 23 and 24 serve to capture and guide away any residual liquid that penetrates through the openings of the passage bodies 3 and 9 into the interior reservoir space 19. The capillary plates 23 and 24 extend longitudinally along the inner wall of the device housing 25, and preferably have a variable radial width as can be seen in FIG. 5C. Namely, the main length portion of each capillary plate 23 or 24 has a slightly larger width that tapers to a narrower width portion in the proximity of each opening of the upper trumpet-shaped passage bodies 3, so that no significant liquid quantities can accumulate at these locations. To further prevent larger quantities of liquid from accumulating in the area of the lower trumpet-shaped passage body 9, the capillary plates 23 and 24 end at a spacing distance away from (i.e. above) the bottom wall or floor 22 of the housing 25, or they extend with only a very narrow width toward the floor in order to direct any liquid accumulating in this area away from the floor 22 and instead along the capillary plates 23 and 24 by capillary action. Furthermore, to optimize the capillary filling behavior, the capillary plates include narrower plates 23 and wider plates 24 that alternate with one another in a star pattern around the circumference of the device housing 25 as can be seen in the sectional view of FIG. 5B. Also, the plates may have alternating lengths.

The central area of the interior reservoir space 19 of the device housing 25 is free of the capillary plates 23 and 24, so that preferably only gas without any liquid collects in this central area. Furthermore, the gas supply and extraction device 2 additionally includes a snail-shaped or spiraling separation chamber 27 arranged in the upper end 26 of the device 2. The inner construction of the separation chamber 27 is especially shown in the sectional view of FIG. 5A. Generally, the separation chamber 27 has a spiraling snail-like configuration comprising a screen or sieve element 28 arranged in a spiral shape within the separation chamber 27. This spiral curvature achieves the effect that any remaining liquid mixed in the gas that enters the separation chamber 27 will be deposited on the screen element 28 as the mixture flows along and/or through the spiral. One capillary plate 29 among the capillary plates 23 and 24 is longer than the other capillary plates, namely is elongated in the longitudinal direction so far toward the separation chamber 27 so that it extends to the outer end of the spiral screen element 28. Thereby, the longer capillary plate 29 serves to collect the last residual liquid that is separated from the gas in the separation chamber 27 and driven out of the chamber 27 by the spiral screen element 28, and then the longer capillary plate 29 serves to return or guide the collected liquid through capillary action back into the interior reservoir space 19 of the device 2. Thus, the separation of the gas and liquid phases is carried out substantially driven by capillary action.

The gas supply and extraction device 2 is preferably rigidly and directly connected to the tank shell, and most preferably to the tank lid 6 that closes a tank opening of the tank wall. Alternatively, the device 2 may be directly and rigidly connected to the tank wall. The tank lid 6 is an especially preferred mounting location for the device 2, because the tank lid 6 is warm relative to the liquid, especially for a tank filled or operated with a cryogenic liquid, so that the gas supply and extraction device 2 has a relatively high temperature compared to the liquid 7. Therefore, the device 2 further acts as a passive heat exchanger and achieves more-uniform temperatures of the out-flowing pressurized driving gas. Also, mounting the device 2 on the tank lid 6 provides the additional advantages of easy access for inspection, maintenance, replacement, or later installation.

In the embodiment discussed above in connection with FIGS. 1, 5A, 5B and 5C, the gas passage or port 4 extends axially along the axis X through the tank lid 6 and communicates into the separation chamber 27 in an axial direction at the center thereof. Alternatively, as shown in FIGS. 6A, 6B and 6C, the gas conduit 5 can communicate through an axially centered gas port at the bottom of the separation chamber 27, and then extend radially outwardly out of the interior reservoir space 19 through the side of the device housing 25 as especially evident in FIGS. 6B and 6C. The screen element 28 acts as a centrifuge to remove the last remaining liquid from the gas, before the gas exits through the gas conduit 5. The gas conduit 5 can alternatively exit radially or laterally out of the separation chamber 27, and in a further alternative can also be directed downwardly out through the tank. In any event, the gas conduit 5 directs the separated gas out of the gas supply and extraction device 2 and thus out of the fuel tank.

Figure 8:
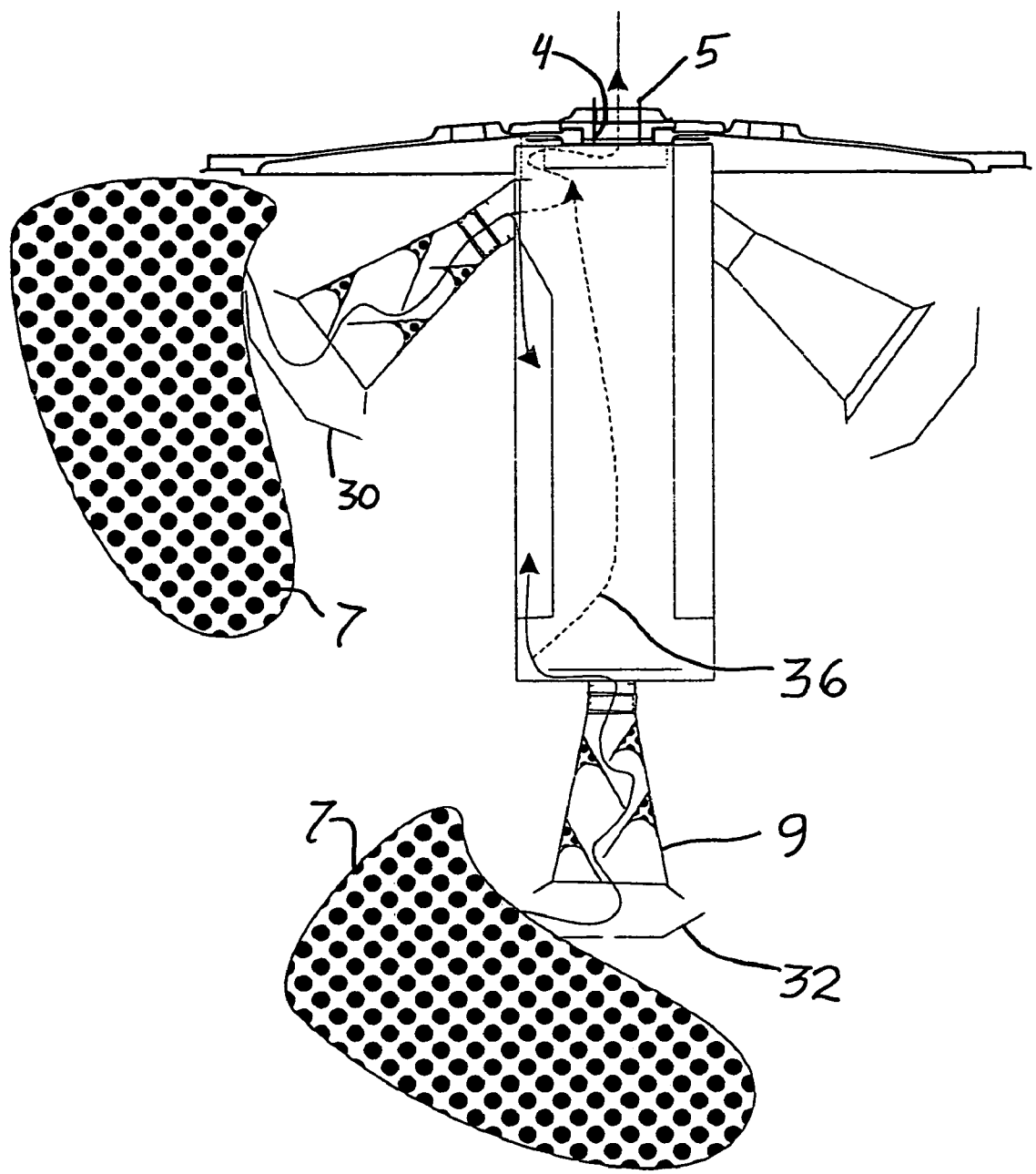
FIG. 8 is a schematic illustration of the multi-stage liquid separation carried out in the device according to FIG. 5C.

FIG. 8 schematically shows a situation in which liquid 7 is encroaching on, but not completely covering or surrounding one of the upper trumpet-shaped passage bodies 3 and the lower trumpet-shaped passage body 9. As can be seen, the liquid 7 is mostly blocked from entering the passage bodies 3 and 9 by the baffle plates 30 and 32, and remaining liquid 7 is separated from the gas through the several liquid separating stages described above, as the gas follows the gas flow path 36 to ultimately exit through the gas passage 4 to the gas conduit 5.

The device 2 ensures a phase separation of the liquid from the gas so long until the area of the capillary plates 23 and 24 of the reservoir space 19 is completely filled with liquid 7.

Thus, the size or volume of the reservoir space 19 in the housing 25 is appropriately designed and dimensioned so that it is sufficient to collect and accumulate all of the liquid arising in gas extraction during a low-acceleration ballistic flight phase of the spacecraft as discussed above.

Figure 9:
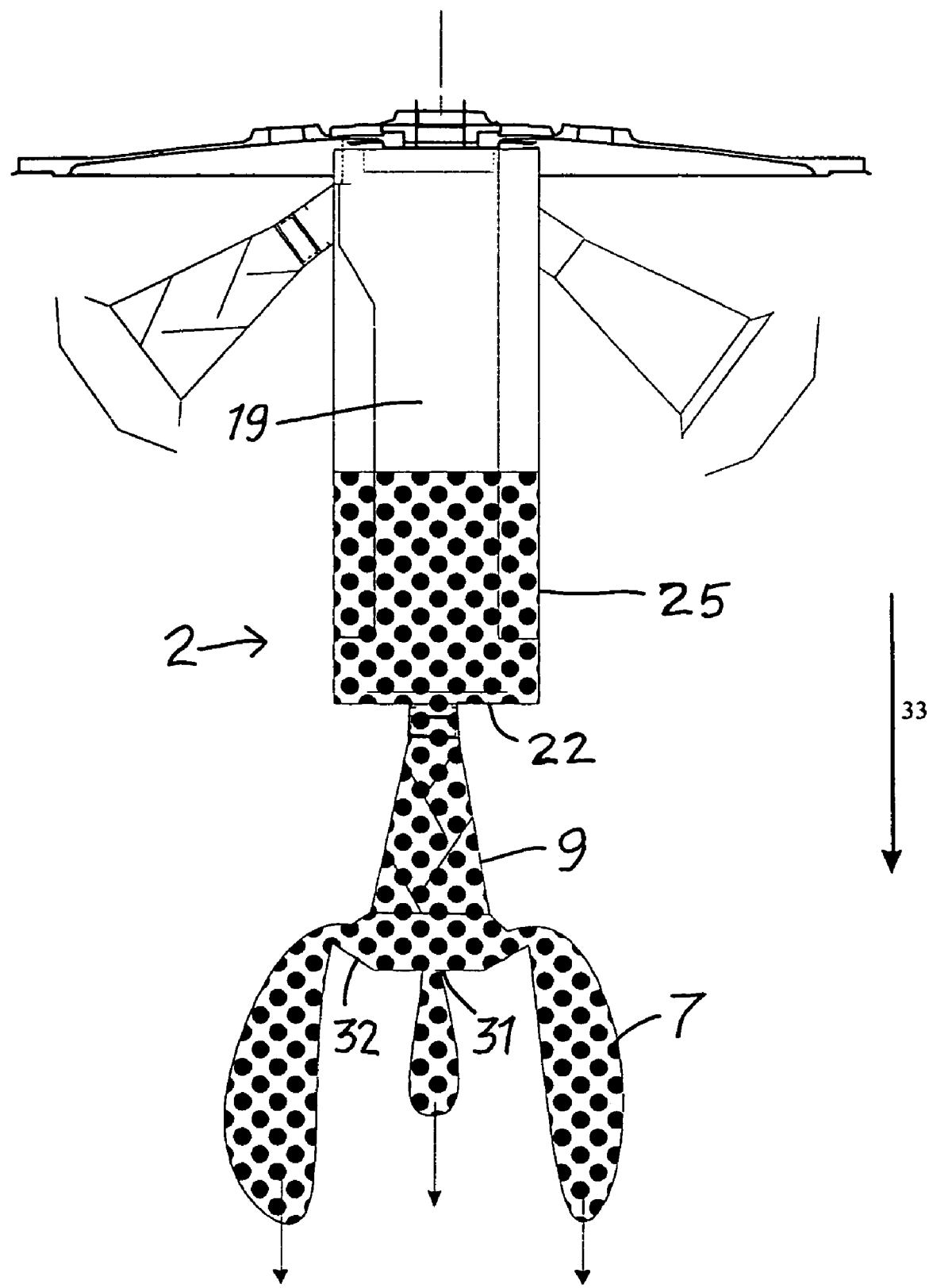
FIG. 9 is a schematic illustration of the process of draining liquid out of the device according to FIG. 5C during an accelerated spacecraft operating phase.

Once the reservoir space 19 of the device has become at least partially or completely filled, it can again be drained or emptied as schematically shown in FIG. 9. To achieve this, an acceleration is applied to the spacecraft and thus to the tank and the device 2 installed therein, to exert an acceleration 33 on the liquid 7 effective in a direction toward the bottom wall 22 of the device housing 25 and the lower trumpet-shaped passage body 9, i.e. in a direction toward the rocket engine that is producing the thrust to apply the acceleration 33. The acceleration applied to the spacecraft is opposite the direction of arrow 33. This acceleration 33 drives the liquid 7 relatively into the lower portion of the interior reservoir space 19 and causes it to flow out through the lower passage body 9. In this regard, the baffle plate 32 is provided with at least one hole 31 to allow the liquid 7 to drain from the plate or bowl-shaped baffle plate 32. Namely, this prevents liquid from accumulating and remaining in the baffle plate 32 during the draining phase. Also, any liquid remaining in the upper passage bodies 3 will also be drained out back into the tank. The openings of the passage bodies 3 and 9, and the plates 10 arranged therein are configured and arranged so that they are oriented or tilted obliquely downwardly, so that liquid can flow and drain out. Thereby it is ensured that the reservoir can be completely emptied of liquid during such an acceleration phase of the operation of the spacecraft. Then the device 2 is again ready to carry out a complete effective separation of liquid from gas.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A tank arrangement for a spacecraft comprising:
   a tank comprising a tank shell enclosing a tank interior space adapted to contain therein a liquid for operation of the spacecraft and a pressurized driving gas adapted to drive the liquid out of said tank; and
   a gas supply and extraction device that is adapted to separate the gas from the liquid and extract the gas out of said tank, wherein said gas supply and extraction device is arranged directly on and connected directly to said tank shell in said tank interior space, and wherein said gas supply and extraction device comprises:
   a device housing that encloses therein a reservoir space,
   a plurality of first passage bodies that are arranged on a perimeter of said device housing relatively proximate to a first end thereof, and that provide respective first open passages communicating through said first passage bodies from said tank interior space to said reservoir space, wherein said first open passages flare with an increasing cross-sectional area toward said tank interior space,
   at least one second passage body that is arranged on said device housing relatively proximate to a second end thereof opposite said first end, and that provides a second open passage communicating through said second passage body from said tank interior space to said reservoir space, wherein said second open passage flares with an increasing cross-sectional area toward said tank interior space,
   a respective plurality of plates respectively arranged in each one of said first and second passage bodies, wherein said plates protrude into said open passage of said respective passage body alternately in succession from opposite sides of an inner surface of said respective passage body,
   a plurality of elongated plates arranged on an inner surface of said device housing and extending longitudinally parallel to a longitudinal axis of said device housing, and
   a gas extraction conduit leading and communicating from said reservoir space out of said device and out of said tank.

2. The tank arrangement according to claim 1, wherein said tank shell comprises a tank wall with a tank opening therein, and a tank lid that is removably secured to said tank wall so as to cover said tank opening, and wherein said gas supply and extraction device is arranged directly on and connected directly to an inner side of said tank lid facing into said tank interior space.

3. The tank arrangement according to claim 2, wherein said gas extraction conduit leads out of said device and out of said tank through said tank lid.

4. The tank arrangement according to claim 1, wherein said gas supply and extraction device is connected directly to said tank shell by a direct metal-to-metal thermally conducting connection.

5. The tank arrangement according to claim 1, wherein said first end of said device housing is connected directly to said tank shell.

6. The tank arrangement according to claim 1, wherein said gas supply and extraction device is arranged in an upper portion of said tank in a direction of thrust of a rocket engine of the spacecraft.

7. The tank arrangement according to claim 1, wherein said gas extraction conduit leads out of said device along said longitudinal axis at said first end.

8. The tank arrangement according to claim 1, wherein said gas extraction conduit leads out of said device in a radial direction relative to said longitudinal axis, proximate to said first end.

9. The tank arrangement according to claim 1, wherein said device further comprises plural baffle plates, with a respective one of said baffle plates respectively arranged in front of a respective open end of each respective one of said first and second passage bodies in said tank interior space, and with a respective gap formed between said respective baffle plate and said open end of said respective passage body, and wherein said baffle plate arranged in front of said second passage body has at least one hole therein.

10. The tank arrangement according to claim 9, wherein said baffle plate arranged in front of said second passage body is arranged concentrically on and extends perpendicularly to said longitudinal axis.

11. The tank arrangement according to claim 1, including only a single said second passage body proximate to said second end, and wherein said second passage body extends axially along said longitudinal axis from said second end of said device housing.

12. The tank arrangement according to claim 11, wherein said first passage bodies are arranged within 25% of a longitudinal length of said device housing adjoining said first end, said second passage body is arranged at said second end, and no other openings pass through said housing in 75% of the longitudinal length of said device housing adjoining said second end.

13. The tank arrangement according to claim 1, wherein each respective one of said passage bodies is trumpet-shaped, and said device housing is cylindrical.

14. The tank arrangement according to claim 1, wherein each one of said plates in a respective one of said first and second passage bodies is arranged to form an acute angle with said inner surface of said respective passage body, and wherein a vertex of said acute angle points inwardly along said open passage toward said reservoir space.

15. The tank arrangement according to claim 1, wherein said gas supply and extraction device further comprises double screen arrangements respectively interposed in said first and second open passages between said reservoir space and said plates in said first and second passage bodies.

16. The tank arrangement according to claim 15, wherein said gas supply and extraction device further comprises wetting barriers respectively interposed between said double screen arrangements and said reservoir space.

17. The tank arrangement according to claim 1, wherein said first passage bodies join onto and extend from said perimeter of said device housing substantially tangentially.

18. The tank arrangement according to claim 1, wherein said device further comprises a gas-liquid separation chamber arranged in an end region of said device housing at said first end thereof.

19. The tank arrangement according to claim 1, wherein at least one of said elongated plates extends longitudinally to said first end of said device housing, and all of said elongated plates are spaced longitudinally away from said second end of said device housing.

20. The tank arrangement according to claim 1, in combination with said liquid which is a cryogenic liquid being liquid hydrogen or liquid oxygen.

21. The tank arrangement according to claim 1, in combination with said liquid which is a storable liquid fuel being monomethylhydrazine (MMH) or hydrazine ($N_2H_4$).

22. The tank arrangement according to claim 1, in combination with said liquid which is a liquid oxidizer being dinitrogentetroxide ($N_2O_4$).

23. A tank arrangement for a spacecraft comprising:
a tank comprising a tank shell enclosing a tank interior space adapted to contain therein a liquid for operation of the spacecraft and a pressurized driving gas adapted to drive the liquid out of said tank; and
a gas supply and extraction device that is adapted to separate the gas from the liquid and extract the gas out of said tank, wherein said gas supply and extraction device is arranged directly on and connected directly to said tank shell in said tank interior space, and wherein said gas supply and extraction device comprises:
a device housing that encloses therein a reservoir space,
a plurality of first passage bodies that are arranged on a perimeter of said device housing relatively proximate to a first end thereof and that provide respective first open passages communicating through said first passage bodies from said tank interior space to said reservoir space, wherein said first open passages flare with an increasing cross-sectional area toward said tank interior space,
at least one second passage body that is arranged on said device housing relatively proximate to a second end thereof opposite said first end, and that provides a second open passage communicating through said second passage body from said tank interior space to said reservoir space, wherein said second open passage flares with an increasing cross-sectional area toward said tank interior space,
a respective plurality of plates respectively arranged in each one of said first and second passage bodies, wherein said plates protrude into said open passage of said respective passage body alternately in succession from opposite sides of an inner surface of said respective passage body,
a plurality of elongated plates arranged on an inner surface of said device housing and extending longitudinally parallel to a longitudinal axis of said device housing,
a gas extraction conduit leading and communicating from said reservoir space out of said device and out of said tank,
plural baffle plates, with a respective one of said baffle plates respectively arranged in front of a respective open end of each respective one of said first and second passage bodies in said tank interior space, and with a respective gap formed between said respective baffle plate and said open end of said respective passage body, wherein said baffle plate arranged in front of said second passage body has at least one hole therein, and
double screen arrangements respectively interposed in said first and second open passages between said reservoir space and said plates in said first and second passage bodies.

* * * * *